United States Patent
Shah et al.

(10) Patent No.: US 6,730,363 B1
(45) Date of Patent: *May 4, 2004

(54) EPOXY NITRILE INSULATOR AND SEAL FOR FUEL CELL ASSEMBLIES

(75) Inventors: Kanu G. Shah, Arlington Heights, IL (US); Frank W. Popielas, Naperville, IL (US); Dennis F. Person, Rockford, IL (US)

(73) Assignee: Dana Corporation, Ottawa Lake, MI (US)

( * ) Notice: Subject to any disclaimer, the term of this patent is extended or adjusted under 35 U.S.C. 154(b) by 117 days.

This patent is subject to a terminal disclaimer.

(21) Appl. No.: 09/708,965

(22) Filed: Nov. 8, 2000

Related U.S. Application Data

(63) Continuation-in-part of application No. 09/644,634, filed on Aug. 23, 2000.

(51) Int. Cl.⁷ .................................................. C08F 2/48

(52) U.S. Cl. ...................... 427/508; 427/115; 427/386; 428/413; 428/418; 428/521; 428/447; 429/12

(58) Field of Search ................................ 427/508, 115, 427/386, 111, 372.2; 428/413, 418, 521, 447; 429/12

(56) References Cited

U.S. PATENT DOCUMENTS

| | | | | |
|---|---|---|---|---|
| 4,025,578 A | * | 5/1977 | Siebert | 525/113 |
| 4,197,178 A | * | 4/1980 | Pellegri et al. | 204/255 |
| 4,220,342 A | | 9/1980 | Shah | 277/228 |
| 4,233,369 A | * | 11/1980 | Breault et al. | 429/26 |
| 4,355,078 A | | 10/1982 | Kaufman | 428/414 |
| 4,510,007 A | * | 4/1985 | Stucke | 153/244.12 |
| 4,609,686 A | * | 9/1986 | Giordano et al. | 522/166 |

(List continued on next page.)

FOREIGN PATENT DOCUMENTS

| | | | |
|---|---|---|---|
| DE | 198 29 142 A 1 | 6/1998 | |
| DE | 298 11 922 U 1 | 7/1998 | |
| EP | 0 385 779 A1 | 3/1990 | |
| EP | 503864 A2 * | 9/1992 | ......... C09D/163/00 |
| EP | 0 902 040 A1 | 9/1998 | |
| EP | 0 933 826 A1 | 2/1999 | |
| EP | 1 075 034 A1 | 4/1999 | |
| EP | 1 009 052 A1 | 5/1999 | |
| EP | 1 006 600 A2 | 11/1999 | |
| WO | WO 96/28396 | 9/1996 | |

OTHER PUBLICATIONS

Derwent English Abstract of DE 298 11 922 U 1.
Delphion Abstract for DE 198 29 142 A 1.
International Search Report—2 pages.
Derwent English Abstract of EP 0902040 A1.
International Search Report—PCT/US01/26124 dated Aug. 21, 2001 (10 pages).

*Primary Examiner*—Rabon Sergent
*Assistant Examiner*—Melanie Bissett
(74) *Attorney, Agent, or Firm*—Rader, Fishman & Grauer PLLC

(57) ABSTRACT

Methods and materials for sealing and insulating a fuel cell plate are disclosed. The disclosed process includes applying a coating precursor on at least one surface of the fuel cell plate, and curing the coating precursor by exposure to radiation. Disclosed coating precursors include those containing an acrylated oligomer and a photoinitiator, which can polymerize in response to ultraviolet or electron beam radiation. Other disclosed coating precursors are those that can polymerize in response to exposure to infrared radiation or to heating, and include epoxy nitrile resins and organopolysiloxane resins. The disclosed processes and coating precursors provide certain advantages over conventional methods and designs for insulating and sealing fuel cell plates since the disclosed coating precursors can be quickly and precisely applied to fuel cell plates by, for example, screening printing.

15 Claims, 1 Drawing Sheet

U.S. PATENT DOCUMENTS

| | | | |
|---|---|---|---|
| 4,732,637 A | 3/1988 | Dettling et al. | 156/295 |
| 4,849,048 A | 7/1989 | Inagaki et al. | 156/275.5 |
| 5,176,966 A | 1/1993 | Epp et al. | 429/26 |
| 5,510,152 A | 4/1996 | Boldt | 427/510 |
| 5,536,758 A | 7/1996 | Boldt | 522/4 |
| 5,631,049 A | 5/1997 | Boldt | 427/508 |
| 5,667,227 A | 9/1997 | Boldt | 277/227 |
| 5,754,338 A | 5/1998 | Wilson et al. | 359/530 |
| 5,882,796 A | 3/1999 | Wilson et al. | 428/411.1 |
| 5,910,858 A | 6/1999 | Frey et al. | 359/534 |
| 6,057,054 A | 5/2000 | Barton et al. | |
| 6,183,901 B1 * | 2/2001 | Ying et al. | 126/291 |
| 6,274,262 B1 * | 8/2001 | Canfield | 29/623.1 |
| 6,337,120 B1 * | 1/2002 | Sasaki et al. | 428/304.4 |

* cited by examiner

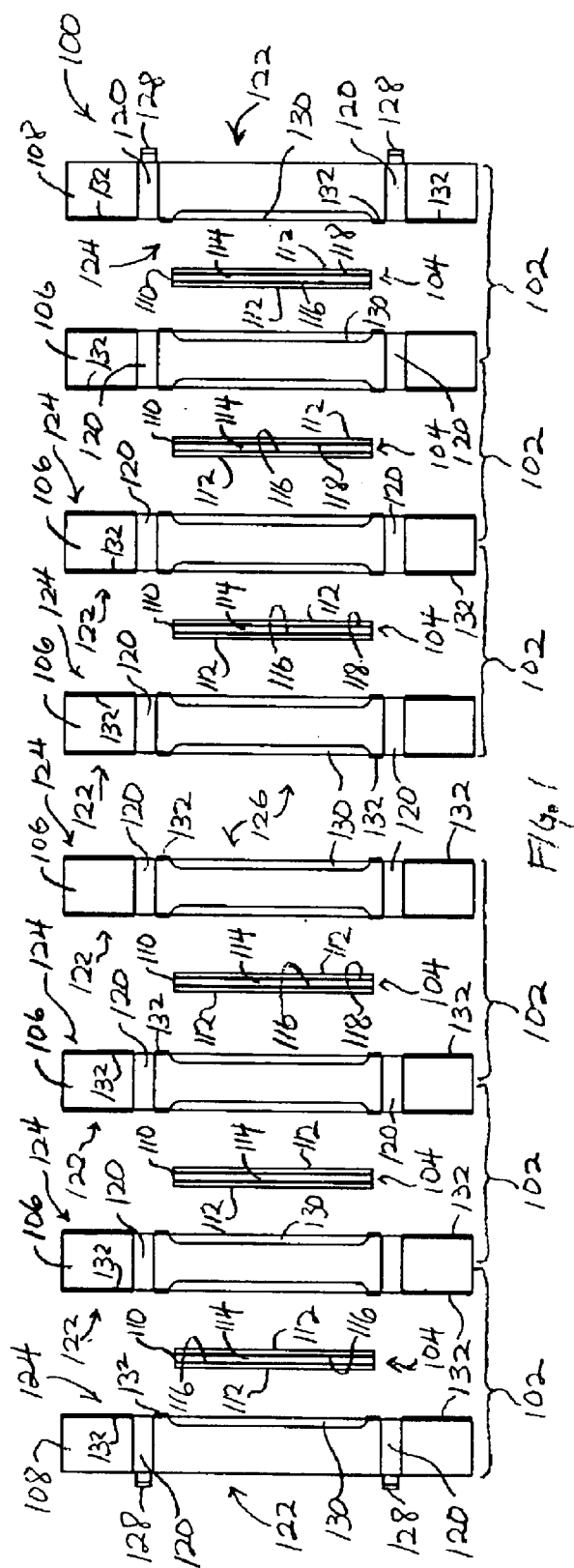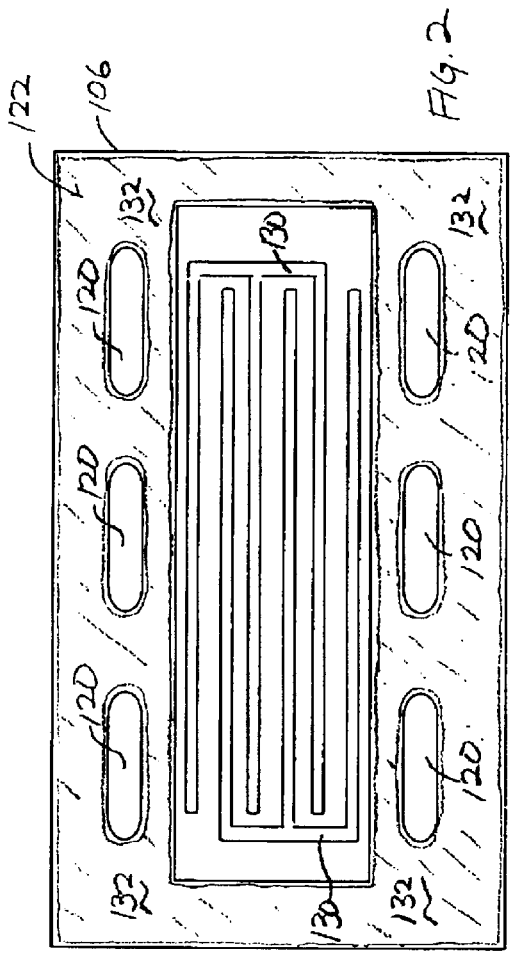

1

EPOXY NITRILE INSULATOR AND SEAL FOR FUEL CELL ASSEMBLIES

CROSS-REFERENCE TO RELATED APPLICATION

This application is a continuation-in-part of Ser. No. 09/644,634, filed Aug. 23, 2000, which is herein incorporated by reference in its entirety.

BACKGROUND OF THE INVENTION

1. Field of Invention

The present invention relates to fuel cells, and more particularly to methods and materials for electrically insulating and sealing fuel cell plates.

2. Discussion

A fuel cell is a device that converts chemical energy of fuels directly to electrical energy and heat. In its simplest form, a fuel cell comprises two electrodes—an anode and a cathode—separated by an electrolyte. During operation, a gas distribution system supplies the anode and the cathode with fuel and oxidizer, respectively. Typically, fuel cells use the oxygen in the air as the oxidizer and hydrogen gas (including $H_2$ produced by reforming hydrocarbons) as the fuel. Other viable fuels include reformulated gasoline, methanol, ethanol, and compressed natural gas, among others. The fuel undergoes oxidation at the anode, producing protons and electrons. The protons diffuse through the electrolyte to the cathode where they combine with oxygen and the electrons to produce water and heat. Because the electrolyte acts as a barrier to electron flow, the electrons travel from the anode to the cathode via an external circuit containing a motor or other electrical load that consumes power generated by the fuel cell.

Currently, there are at least five distinct fuel cell technologies, each based on a different electrolyte. One class of fuel cells, which is known as a polymer electrolyte membrane (PEM) fuel cell, appears well-suited for mobile power generation (transportation applications) because of its relatively low operating temperatures (about 60° C. to about 100° C.) and its quick start up. PEM fuel cells use an electrolyte composed of a solid organic polymer, which is typically a poly-perfluorosulfonic acid. Other fuel cell technologies include electrolytes comprised of solid zirconium oxide and yttrium (solid oxide fuel cells) or a solid matrix saturated with a liquid electrolyte. Liquid electrolytes include aqueous potassium hydroxide (alkaline fuel cells), phosphoric acid (phosphoric acid fuel cells), and a mixture of lithium, sodium, and/or potassium carbonates (molten carbonate fuel cells). Although phosphoric acid fuel cells (PAFC) operate at higher temperatures than PEM fuel cells (about 175° C. to about 200° C.), PAFCs also find use in vehicle applications because of their higher efficiency and their ability to use impure hydrogen gas as fuel.

The core of a typical PEM fuel cell is a three-layer membrane electrolyte assembly (MEA). The MEA is comprised of a sheet of the polymeric electrolyte, which is about $50\mu$ (microns) to about $175\mu$ thick and is sandwiched between relatively thin porous electrodes (anode and cathode). Each of the electrodes usually consists of porous carbon bonded to platinum particles, which catalyze the dissociation of hydrogen molecules to protons and electrons at the anode and the reduction of oxygen to water at the cathode. Both electrodes are porous and therefore permit gases (fuel and oxidizer) to contact the catalyst. In addition, platinum and carbon conduct electrons well so that electrons move freely throughout the electrodes.

An individual fuel cell generally includes backing layers that are placed against the outer surfaces of the anode and the cathode layers of the MEA. The backing layers allow electrons to move freely into and out of the electrode layers, and therefore are often made of electrically conductive carbon paper or carbon cloth, usually about $100\mu$ to $300\mu$ thick. Since the backing layers are porous, they allow fuel gas or oxidizer to uniformly diffuse into the anode and cathode layers, respectively. The backing layers also assist in water management by regulating the amount of water vapor entering the MEA with the fuel and oxidizer and by channeling liquid water produced at the cathode out of the fuel cell.

A complete fuel cell includes a pair of plates pressed against the outer surfaces of the backing layers. Besides providing mechanical support, the plates define fluid flow paths within the fuel cell, and collect current generated by oxidation and reduction of the chemical reactants. The plates are gas-impermeable and have channels or grooves formed on one or both surfaces facing the backing layers. The channels distribute fluids (gases and liquids) entering and leaving the fuel cell, including fuel, oxidizer, water, and any coolants or heat transfer liquids. As discussed below, each plate may also have one or more apertures extending through the plate that distribute fuel, oxidizer, water, coolant and any other fluids throughout a series of fuel cells. Each plate is made of an electron conducting material including graphite, aluminum or other metals, and composite materials such as graphite particles imbedded in a thermosetting or thermoplastic polymer matrix.

For most applications, individual fuel cells are connected in series or are "stacked" to form a fuel cell assembly. A single fuel cell typically generates an electrical potential of about one volt or less. Since most applications require much higher voltages—for example, conventional electric motors normally operate at voltages ranging from about 200 V to about 300 V—individual fuel cells are stacked in series to achieve the requisite voltage. To decrease the volume and mass of the fuel cell assembly, a single plate separates adjacent fuel cells in the stack. Such plates, which are known as bipolar plates, have fluid flow channels formed on both major surfaces—one side of the plate may carry fuel, while the other side may carry oxidizer.

Because the fluids flowing within a particular fuel cell and between adjacent fuel cells must be kept separate, conventional fuel cell assemblies employ resilient o-rings or planar inserts disposed between adjacent fuel cell plates to seal flow channels and apertures. In addition, conventional fuel cell assemblies also provide electrical insulating sheets between adjacent plates to prevent individual fuel cells from short-circuiting. Although such seals and insulators are generally satisfactory, they suffer certain disadvantages. For example, freestanding o-rings and planar inserts must be carefully aligned with channels and apertures to ensure proper sealing and insulation, which is time consuming. Because of their non-standard sizes and shapes, planar inserts used in fuel cell assemblies are typically made by injection molding, compression molding, or transfer molding, which require expensive, one-of-a-kind tooling. Furthermore, many of the resilient materials used to make o-rings and planar inserts do not have the requisite chemical resistance and low modulus to adequately seal fuels cells operating at higher temperatures or employing hydrocarbon-based heat transfer fluids and coolants.

The present invention helps overcome, or at least mitigates one or more of the problems described above.

SUMMARY OF THE INVENTION

The present invention provides a process for sealing and insulating a fuel cell assembly comprised of two or more fuel cell plates. The process includes providing a fuel cell plate having first and second surfaces and applying a coating precursor on at least the first surface of the fuel cell plate. Since the coating precursor is capable of polymerizing (curing) in response to exposure to energy, the method also includes heating the coating precursor on the fuel cell plate via radiant (infrared) heating or convective heating to initiate polymerization. Useful coating precursors include epoxy nitrile resins.

The invention also provides an insulated fuel cell plate comprised of a plate having first and second surfaces and a coating precursor applied to at least one of the first and second surfaces of the plate. The coating precursor is an epoxy nitrile resin, which comprises an epoxy resin and an acrylonitrile butadiene copolymer. The epoxy nitrile resin optionally includes a thermoplastic film-former, a polyamine cross-linking agent, and a solvent.

The present invention offers certain advantages over conventional methods and designs for insulating and sealing fuel cell plates and fuel cell assemblies. For example, unlike o-rings and molded inserts, the disclosed coating precursors can be quickly and precisely applied to fuel cell plates (e.g., by screen printing) resulting in substantial cost savings. Furthermore, in contrast to many conventional resilient materials, the cured solid coatings combine good chemical resistance with excellent mechanical properties.

BRIEF DESCRIPTION OF THE DRAWINGS

FIG. 1 is a sketch of an exploded cross sectional view of a fuel cell assembly (not to scale).

FIG. 2 is plan view of one of the fuel cell plates having a coating for sealing and insulating the fuel cell assembly of FIG. 1.

DETAILED DESCRIPTION OF THE PREFERRED EMBODIMENTS

Although described in relation to a PEM fuel cell assembly, the disclosed coating precursors can be used to seal and insulate other types of fuel cells, including, but not limited to alkaline fuel cells and phosphoric acid fuel cells.

FIG. 1 shows an exploded cross sectional view (not to scale) of a representative fuel cell assembly 100. The fuel cell assembly 100 includes a stack of six individual fuel cells 102, although the number of fuel cells 102 can vary depending upon the desired voltage. Each of the fuel cells 102 includes a multi-layer active portion 104 sandwiched between a pair of bipolar plates 106 or between a single bipolar plate 106 and an end plate 108. Each active portion 104 includes a membrane electrolyte assembly (MEA) 110 disposed between a pair of backing layers 112. The MEA 110 includes a polymer electrolyte membrane (PEM) 114 interposed between an anode 116 and a cathode 118.

FIG. 2 shows a plan view of one of the bipolar plates 106, and with FIG. 1, illustrates fluid flow paths within the fuel cell assembly 100. Each of the plates 106, 108 shown in FIG. 1 have apertures 120 that extend between first 122 and second 124 major surfaces of the plates 106, 108. When the plates 106, 108 are stacked to produce the fuel cell assembly 100, the apertures 120 of adjacent plates 106, 108 align, forming cavities (not shown) that extend throughout the fuel cell assembly 100. Some of the cavities deliver fluids (fuel, oxidizer) to individual fuel cells 102, or deliver fluids (coolant, heat transfer fluid) to cooling areas 126 between individual fuel cells 102. Other cavities serve as collection regions for fluids (reaction products, coolant, heat transfer fluid). During operation, fuel, oxidizer, coolant, and reaction products enter and leave the cavities through fluid connections 128 located on the end plates 108. As noted above, the plates 106, 108 also have grooves or channels 130 formed on either or both of the first 122 and second 124 surfaces, and evenly distribute reactants or heat transfer fluid across the active portion 104 and the cooling area 126 of each of the fuel cells 102.

As can be seen in FIG. 1 and FIG. 2, the plates 106, 108 include a resilient coating 132, which is applied on either or both of the major surfaces 122, 124 of the plates 106, 108. As noted above, the coating 132 prevents mixing of disparate fluid streams during operation of the fuel cell assembly 100, and prevents electrical conduction among adjacent plates 106, 108. In addition, the coating 132 is chemically resistant to heat transfer fluids and electrolytes used in the various types of fuel cells, does not substantially interfere with fuel cell chemistry, is thermally stable at operating temperatures, and exhibits good adhesion to the plates 106, 108. The thickness and mechanical properties of the coating 132 will depend on the dimensions and properties of the plates 106, 108 and the active portion 104 of each of the fuel cells 102. Typically, however, the coating 132 is about $50\mu$ to $250\mu$ thick, has a tensile strength greater than about 500 psi, an elongation greater than about 100 percent, and a Shore A hardness between about 45 and about 85.

The coating 132, which is applied on the plates 106, 108 in a fluid state and then solidified in situ, comprises a blend of one or more reactive coating precursors that are subsequently polymerized and/or cross-linked. Here, "reactive" means that the components of the coating 132 react with one another other or self-react to cure (solidify); such materials are also referred to as thermosetting resins. Depending on the type of reactive components employed, the coating 132 can be cross-linked and/or polymerized using any number of mechanisms, including oxidative curing, moisture curing, thermal curing, high energy radiation curing (e.g., ultraviolet curing, electron beam curing), condensation and addition polymerization, and the like.

Useful reactive precursors include, but are not limited to acrylate resins such as acrylated urethanes, vinyl acrylates, acrylated epoxies, acrylated polyesters, acrylated acrylics, acrylated polyethers, acrylated olefins, acrylated oils, and acrylated silicones. Other useful reactive precursors include epoxy resins such as bisphenol epoxy resins, and organopolysiloxane resins, which include alkylalkoxysilane resins. These reactive precursors can be cured using mechanisms described above, typically in less than 45 minutes. Rapidly acting forms of radiation, which require application for less than about 30 seconds, and in some cases, for less than about 5 seconds are particularly useful. Useful forms of radiation include ultraviolet (UV) radiation, infrared radiation, microwave radiation, and electron beam radiation. Depending on the particular curing mechanism, the coating 132 precursor can include a catalyst, an initiator, or curing agent to help initiate and/or accelerate curing. Note that in this disclosure "resins" or "resin systems" refer to polydisperse systems containing monomers, oligomers, polymers, or combinations thereof.

Exposing the coating precursor to high energy radiation represents a particular useful method of polymerizing the reactive components in coating precursors, offering additional advantages for fuel cell coatings 132 over thermally-cured reactive coating precursors. For instance, radiation cured coating precursors can be cross-linked at much lower temperatures (e.g., ambient temperature) than heat-cured reactive coating precursors. This is an advantage when using graphite composite fuel cell plates that can warp at temperatures associated with heat-cured coatings. Radiation curing can proceed via at least two mechanisms. In a first mechanism, radiation provides fast and controlled generation of highly reactive species (free radicals) that initiate polymerization of unsaturated materials. In a second mechanism, radiation (UV/electron beam) activate certain cationic photoinitiators that decompose to yield an acid catalyst that propagates the cross-linking reaction. For the purposes of this disclosure, "thermally-cured" or "heat-cured" refers to coating precursors cross-linked using heating processes dominated by convection and/or conduction.

Acrylate Resins

Examples of reactive precursors that can be cured using high energy radiation (ultraviolet, electron beam, and so on) include, but are not limited to the acrylate resins. These reactive precursors include acrylates and methacrylates, and can be monomers or oligomers (i.e., moderately low molecular weight polymers typically containing 2–100 monomer units, and often 2–20 monomer units) of varying molecular weight (e.g., 100–2000 weight average molecular weight). Useful reactive coating precursors include, but are not limited to acrylated urethanes, acrylated epoxies, acrylated olefins, and mixtures thereof. The acrylate resins typically comprise from about 30 wt. % to about 80 wt. % of the coating precursor, and preferably comprise from about 45 wt. % to about 60 wt. % of the coating precursor.

Acrylated urethanes are diacrylate esters of hydroxy terminated NCO extended polyesters or polyethers. They can be aliphatic or aromatic, although acrylated aliphatic urethanes are generally more useful in fuel cell applications because they are less susceptible to attack by the heat transfer fluids and electrolytes and because they appear to provide better mechanical properties (tensile, elongation, hardness). The acrylated urethane provides the "backbone" of the cured coating, and therefore is usually present in the highest concentration, though too high a concentration may result in an unacceptably soft coating exhibiting insufficient thermal and chemical resistance. The acrylated urethanes typically comprise from about 25 wt. % to about 65 wt. % of the coating precursor, and preferably comprise from about 40 wt. % to about 47 wt. % of the coating precursor. Examples of useful acrylated urethanes include those commercially available from Henkel Corp. under the trade name PHOTOMER (e.g., PHOTOMER 6010) and from UCB Radcure Inc. under the trade names EBECRYL (e.g., EBECRYL 220, 284, 4827, 4830, 6602, 8400 and 8402), RXO (e.g., RXO 1336), and RSX (e.g., RSX 3604, 89359, 92576). Other useful acrylated urethanes are commercially available from Sartomer Co. under the trade name SARTOMER (e.g., SARTOMER 9635, 9645, 9655, 963-B80, and 966-A80), and from Morton International under the trade name UVITHANE (e.g., UVITHANE 782).

Acrylated epoxies are diacrylate esters of epoxy resins, such as the diacrylate esters of bisphenol A epoxy resin, and include epoxy resins having a pendent nitrile moiety. Acrylated epoxy resins generally improve the thermal stability and chemical resistance of the fuel cell coating 132, and increase its tensile strength. However, including an excessive amount of an acrylated epoxy may degrade the coating's adhesion to the plates 106, 108 and may also adversely impact its ability to seal. The acrylated epoxies typically comprise from about 5 wt. % to about 20 wt. % of the coating precursor, and preferably comprise from about 8 wt. % to about 13 wt. % of the coating precursor. Examples of useful acrylated epoxies include those commercially available from UCB Radcure Inc. under the EBECRYL and RXO trade names (e.g., EBECRYL 600, 629, 860 and 3708, RXO 2034) and from Henkel Corp. under the PHOTOMER trade name (e.g., PHOTOMER 3016, 3038 and 3071).

Acrylated acrylics are acrylic oligomers or polymers that have reactive pendant or terminal acrylic acid groups capable of forming free radicals for subsequent reaction, and include acrylic resins having a pendant nitrile moiety. Like the acrylated epoxies, the acrylated acrylics (especially those having pendant nitrile groups) generally improve the thermal stability of the fuel cell coating 132 and increase its tensile strength. The acrylated acrylics typically can comprise from about 0 wt. % to about 25 wt. % of the coating precursor, and preferably comprise from about 0 wt. % to about 13 wt. % of the coating precursor. Examples of useful acrylated acrylics are those commercially available from UCB Radcure under the EBECRYL trade name (e.g., EBECRYL 745, 754, 767, 1701, and 1755), from Sartomer Co. under the trade designation NTX4887 (a fluoro-modified acrylic oligomer), and from B.F. Goodrich under the trade name HYCAR (e.g., HYCAR 130X43).

Similarly, acrylated olefins are unsaturated oligomeric or polymeric materials having reactive pendant or terminal acrylic acid groups capable of forming free radicals for cross-linking or chain extension. Like the acrylated epoxies and acrylics, the acrylated olefins generally improve the thermal stability of the fuel cell coating 132 and increase its tensile strength. The acrylated olefins typically can comprise from about 0 wt. % to about 20 wt. % of the coating precursor, and preferably comprise from about 0 wt. % to about 13 wt. % of the coating precursor. Examples of useful acrylated olefins include polybutadiene acrylic oligomers, which are commercially available from Sartomer Co. under the trade name SARTOMER CN302, and from Ricon Resins under the trade name FX9005.

The reactive precursors ordinarily include a reactive diluent for controlling viscosity, for increasing cross-link density, and for promoting adhesion. The reactive diluent includes at least one mono- or multi-functional monomer. Here, "mono-functional" refers to a compound that contains one carbon-carbon double bond, and multi-functional refers to a compound that contains more than one carbon-carbon double bond or another chemically reactive group that can cross-link. Reactive diluents are generally acrylate monomers, although non-acrylates such as n-vinyl pyrrolidone, limonene, and limonene oxide, can also be used, as long as the monomers are ethylenically unsaturated. The mono-functional monomers decrease the viscosity of the coating precursor without substantially degrading the properties of the coating. Used in proper proportions, the mono-functional monomers can, in some cases, improve bulk mechanical properties (adhesion, tensile strength, elongation) as well. The mono-functional monomers typically comprise from about 20 wt. % to about 40 wt. % of the coating precursor, and preferably comprise from about 25 wt. % to about 35 wt. % of the coating precursor. Examples of useful mono-functional monomers include, but are not limited to ethyl acrylate, methyl methacrylate, isooctyl acrylate, oxethylated phenol acrylate, 2-ethylhexyl acrylate, 2-phenoxyethyl acrylate, 2-(ethoxyethoxy)ethyl acrylate, ethylene glycol methacrylate, tetrahydroxy furfuryl acrylate, caprolactone acrylate, and methoxy tripropylene glycol monoacrylate. Particularly useful mono-functional monomers include isobornyl acrylate monomer and octyldecyl acrylate monomer, which are available from UCB Radcure under the trade names IBOA and ODA, respectively.

Like mono-functional monomers, multi-functional monomers decrease the viscosity of the coating precursor, but also accelerate the rate of cure, and increase the cross-link density, which improves chemical resistance and increases tensile strength while decreasing elongation. Since the multi-functional monomers increase cross-link density, they are useful at lower concentrations than the mono-functional monomers, typically comprising from about 1 wt. % to about 5 wt. % of the coating precursor, and preferably comprising from about 2 wt. % to about 4 wt. % of the coating precursor. Examples of useful multi-functional monomers include, but are not limited to triethylene glycol diacrylate, methoxyethyoxylated trimethylpropane diacrylate, pentaerythritol triacrylate, glycerol triacrylate, glycerol trimethacrylate, trimethylolpropane propoxylate triacrylate, trimethylolpropane trimethacrylate, trimethylolpropane triacrylate, 1,6-hexanediol diacrylate, 1,4-butanediol diacrylate, tetramethylene glycol diacrylate, tripropylene glycol diacrylate, ethylene glycol dimethacrylate, ethylene glycol diacrylate, tetraethylene glycol diacrylate, polyethylene glycol diacrylate, pentaerythritol tetraacrylate, pentaerythritol tetramethacrylate, and 1,6-hexane diacrylate. Other mono- and multi-functional monomers include vinyl acetate, n-vinyl formamide, limonene oxide, and n-vinyl pyrrolidinone. Particularly useful multi-functional monomers include propoxylated glycerol triacrylate monomer and trimethylolpropane ethoxy triacrylate monomer, which are available from UCB Radcure under the trade names OTA-480, and TMPEOTA, respectively.

The adhesion promoter includes at least one radiation curable material, such as mono- or multi-functional monomers or oligomers. One particularly useful adhesion promoter is a methacrylated polyol adhesion promoter available from UCB Radcure under the trade name EBECRYL 168. Typically, the adhesion promoter comprises from about 1 wt. % to about 15 wt. % of the coating precursor, and preferably comprises from about 7 wt. % to about 11 wt. % of the coating precursor. Most of the disclosed reactive monofunctional and multi-functional acrylate monomers are commercially available from UCB Radcure under the EBECRYL trade name, from Henkel Corp. under the PHOTOMER trade name, and from Sartomer Co. under the SARTOMER trade name.

Ordinarily, the reactive precursor includes at least one mono-functional monomer, at least one multi-functional monomer, and at least one multi-functional oligomer. Typically, the reactive precursors include mono-functional and multi-functional acrylated monomers having molecular weights no greater than about 1000 (usually between about 100–1000) and a multi-functional oligomeric acrylated urethane having a weight average molecular weight of at least about 500, but generally between about 500–7000. As indicated above, increasing the fraction of mono-functional monomers tends to lower the viscosity of the coating precursor blend and improve wet-out on the surfaces 122, 124 of the plates 106, 108. Furthermore, increasing the fraction of multi-functional monomers and oligomers (e.g., diacrylates and triacrylates) tends to increase cross-linking, resulting in stronger adhesion, higher tensile strength, improved chemical resistance, but lower elongation.

The coating precursor normally includes one or more photoinitiators when it is cross-linked or polymerized with ultraviolet radiation. Examples of photopolymerization initiators (photoinitiators) include, but are not limited to organic peroxides, azo compounds, quinones, benzophenones, nitroso compounds, acryl halides, hydrozones, mercapto compounds, pyrylium compounds, triacrylimidazoles, bisimidazoles, chloroalkytriazines, benzoin ethers, benzil ketals, thioxanthones, and acetophenone derivatives, and mixtures thereof. Specific examples include benzil, methyl o-benzoate, benzoin, benzoin ethyl ether, benzoin isopropyl ether, benzoin isobutyl ether, benzophenone-tertiary amine, acetophenones such as 2,2-diethoxyacetophenone, benzyl methyl ketal, 1-hydroxycyclohexylphenyl ketone, 2-hydroxy-2-methyl-1-phenylpropan-1-one, 1-(4-isopropylphenyl)2-hydroxy-2-methylpropan-1-one, 2-benzyl-2-N,N-dimethylamino-1-(4-morpholinophenyl)-1-butanone, 2,4,6-trimethylbenzoyl-diphenylphosphine oxide, 2-methyl-1-4(methylthio), phenyl-2-morpholino-1-propanone, bis(2,6-dimethoxybenzoyl)(2,4,4-trimethylpentyl)phosphine oxide, and so on. The amount of the photoinitiators should be sufficient to generate the desired rate of curing and to produce the requisite coating properties and typically comprises from about 0.1 wt. % to about 10 wt. % of the coating precursor, and preferably comprises from about 1 wt. % to about 8 wt. %. A particularly useful blend of photoinitiators comprises from about 1 wt. % to about 4 wt. % benzophenone and from about 1.5 wt. % to about 5 wt. % of 1-phenyl-2-hydroxy-2-methyl-1-propanone of the coating precursor. Benzophenone is commercially available from Sartomer Co., and the propanone is commercially available from Ciba-Geigy Corp. under the trade name of DAROCUR 1173.

The coating precursors may contain additives such as fillers, defoamers, flattening agents, wetting agents, slip aids, stabilizers, plasticizers, air-release agents, and the like. The additives can be reactive or non-reactive, but are typically non-reactive. Examples of useful non-reactive air-release agents include polydimethyl siloxanes, such as various DC-series silicone oils commercially available from Dow Corning, and SAG 47, which is commercially available from OSI Specialties. Typically, such additives (including air-release agents) are used in amounts necessary to achieve the requisite coating characteristics, and each generally comprises up to about 5 wt. % of the total weight of coating precursor.

In addition, the coating precursors may also contain various solvents other than the reactive diluent monomers to help dissolve or swell the higher molecular weight reactive resins (e.g., the acrylated oligomers). Such solvents are referred to as non-reactive diluents or non-reactive monomers because they do not significantly polymerize or cross-link with the reactive resin components. Useful solvents include ketone solvents, tetrahydrofuran, xylene, and the like, although preferably the coating precursors contain no solvents. The coating may also contain colorants (i.e., pigments and dyes). Examples of suitable colorants include $TiO_2$, phthalocyanine blue, phthalocyanine green, carbon black, basic carbonate white lead, zinc oxide, zinc sulfide, antimony oxide, zirconium oxide, lead sulfochromate, bismuth vanadate, bismuth molybdate, iron oxide magnetite, $Fe_3O_4$, and iron (III) oxide, $Fe_2O_3$, among others. Pigments can comprises from 0 wt. % to about 5 wt. % of the coating precursor.

As noted above, the acrylate resins are typically cured using radiation such as ultraviolet light. Following application of the coating precursor, the fuel cell plates are placed on a conveyer that transports the plates under one or more sets of ultraviolet lamps, resulting in successive in-line exposure of the coating precursor to ultraviolet radiation. The sets of ultraviolet lamps have nominal radiant wavelengths that are the same or different. The length of exposure is controlled by the conveyor speed, which is typically in the range of 10 to 40 feet per minute and results in exposure times in the range of about 0.5 to about 5 seconds for each set of lamps. The UV lamps typically have power ratings from about 300 to about 600 watts per linear inch. Useful UV lamps include those employing type D, type V, type H, or type H$^+$ bulbs, which are commercially available from Fusion UV Curing Systems and have nominal wavelengths of 375 nm, 425 nm, 250 nm, and 220 nm, respectively. Other useful UV lamps include arc-type UV lamps having a mercury spectrum similar to Fusion type H bulbs.

One useful curing process employs two sets of arc-type UV lamps or UV lamps having type H bulbs. Another useful curing process uses a first set of UV lamps having type D bulbs (longer wavelength UV light), and a second set of UV lamps having type H or H$^+$ bulbs (shorter wavelength UV light). Although not bound to any particular theory, it is believed that an initial exposure to UV lamps having type D bulbs cures the interior portions of the coating layer and adheres the coating to the surface of the fuel cell plate. Subsequent exposure to UV lamps having type H or H$^+$ bulbs, cures the outer portions of the coating layer. While the two-step curing process produces a satisfactory coating, curing under an inert nitrogen atmosphere may enhance coating properties. A flow rate of 20 cubic feet per minute of nitrogen through the curing equipment has been found in some instances to improve surface curing.

Organopolysiloxanes

In addition to the disclosed acrylates, useful reactive coating precursors include organopolysiloxanes, including polymers of lower alkyl or lower alkenyl siloxanes, phenyl siloxanes, lower alkyl or lower alkenyl substituted phenyl siloxanes, and mixtures thereof, the preparation of which is known in the art. For example, the organopolysiloxanes may include from about 15 to about 40 mole percent of alkyl siloxane units, from about 25 to about 55 percent phenyl siloxane units, and from about 30 to about 50 mole percent alkyl phenyl siloxane units. The silicon atoms of the various siloxane structural units are linked together by oxygen atoms in an alternating lattice of oxygen and silicon atoms. While a major portion of the oxygen atoms of the units are linked to two silicon atoms, a portion of the oxygen atoms are active centers for further polymerization and are present as residual hydroxyl, alkoxy, or like radicals.

The polysiloxane may contain linear, branched, or cyclic units, cured by condensation or addition polymerization, and are preferably cross-linked. For this purpose, cross-linking agents, known in the art may also be present. Such agents are usually unsaturated and may contain such unsaturated groups as vinyl groups. Their use leads to a three-dimensional network.

One class of useful organopolysiloxanes has the formula

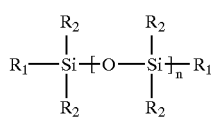

I in which $R_1$ and $R_2$ are monovalent substituents, which may be the same or different and are selected from hydrogen, methyl, ethyl, propyl, isopropyl, butyl, isobutyl, vinyl, allyl, phenyl, methyl phenyl, ethyl phenyl, propyl phenyl, isopropyl phenyl, butyl phenyl, isobutyl phenyl, tolyl, and zylyl, provided that not more than half of the $R_2$ substituents are hydrogen, and provided that n is a number sufficiently low to ensure that the reactive coating precursor is in the liquid state. Except where $R_1$ or $R_2$ is hydrogen, the substituents are connected to silicon atoms by a carbon-silicon linkage.

In one useful organopolysiloxane, there is an n-alkyl to phenyl ratio of 1:1 per siloxane unit.

As indicated, preferably an organopolysiloxane precursor is applied to the fuel cell plate in a sufficiently low state of polymerization as to be in liquid form and then polymerized to a final solid state. This is usually accomplished by heating the plate, although polymerization can also be carried out by ionizing radiation. The preferred fluid coating precursors have a viscosity of about 100 centipoises to about 100,000 centipoises at 25° C. It should be appreciated that to obtain cross-link during polymerization, the polymeric chain may have pendant silicon bonded olefinic siloxy units through which cross-linking may take place.

When the organosiloxane is in the solid state, n may vary from 10 to as much as 2500 or more, including the final polymerized state of the polysiloxane when it is cross-linked in a three dimensional network structure. Weight average molecular weights of the cross-linked polysiloxane may vary, as for example, from about 250,000 to about 700,000.

The presence of a phenyl radical is important to both the flexibility and thermal resistance of the disclosed polysiloxane resins. Generally, the polysiloxane resins should contain at least about 10 mole percent of the phenyl radical. In the preferred embodiment, the pendant $R_2$ substituents comprise about 50 mole percent alkyl and about 50 mole percent phenyl. The preferred alkyl substituent for $R_2$ is methyl.

Processes for preparing the polysiloxanes are known in the art. In general, an alkyl chloride, such as methyl chloride, reacts under catalysis with silicon metal to form a family of organochlorosilanes. Hydrolysis of the organochlorosilanes can lead to the polysiloxanes. The polymerization embodies largely cross-linking of the polymeric chains as represented in Formula I, although some chain extension can occur. Generally, catalysts such as peroxides, platinum and zinc are incorporated with the polysiloxanes and upon exposure to heat generate free radicals which activate the alkyl ($R_2$) groups by hydrogen removal, such that the residue alkylene radicals define active sites for cross-linking. For example, two methyl groups of two different polymer chains may be so activated to form an ethylene cross-link. Where the $R_1$ substituents are unsaturated, as in vinyl, cross-linking can occur here as well due to the unsaturation of such groups. Or an unsaturated cross-linking agent can be present such as styrene.

It is this situs of the cross-linking activity away from the ends of the polymeric chains which leads to considerably more cross-linking than is the case when the polymeric chains cross-link only at their ends. The increased amount of cross-linking between the chains is, in turn, thought to result in tougher, more heat resistant polysiloxane resins.

The peroxide catalyst is used in an amount of about 0.05 percent to about 2 percent by weight of the resin and can comprise t-butyl perbenzoate, which is stable in the polysiloxane compositions at room temperatures but rapidly decomposes at about 300° F. Other peroxide catalysts that can be used include benzoyl peroxide, phthalic peroxide, chlorobenzoyl peroxide, acetyl benzoyl peroxide, cyclohexyl hydroperoxide, diacetyl peroxide, and the like. However, cross-linking can be achieved by other than peroxide catalysis, such as by platinum metal or zinc metal which may be used in amounts up to about 0.5 percent by weight based on the weight of the polysiloxanes. Metal salts of carboxylic acids, such as cobalt octoate, may be similarly used.

The coating should be flexible in order best to adapt it for a variety of mechanical applications and to increase its useful life. The use of the described polysiloxane resins alone suffices for most uses. In fact, flexibility of the polysiloxane coating can be varied by changing the mole ratio of the alkyl to phenyl $R_2$ substituents of the above formula, such as from about 1 to about 10. In any case, it should be understood that the organopolysiloxane that is to be polymerized or cured can, as a liquid, be a homopolymer, a copolymer, or a terpolymer, and can be either a single compound or a mixture of two or more different organopolysiloxanes.

The reactive coating precursor optionally includes an organotitinate. In general, useful organotitanates include salts of titanic acid in which the salt moiety is saturated or unsaturated, cyclic or acyclic, or aromatic. However, a desirable class of organotitanates has the formula, $$Ti(OR_3)_4 \qquad \qquad II$$

in which $R_3$ is a monovalent substituent which may be the same or different and is selected from alkyl and cycloalkyl from 1 to about 10 carbon atoms, alkenyl from 2 to about 4 carbon atoms, aliphatic acyl of 2 to about 8 carbon atoms, amido up to about 6 carbon atoms, benzyl, and hydrogen, provided that not all $R_3$'s are hydrogen. Usually, the organopolysiloxane includes from about 0% to about 4% by weight of the organotitanate.

Usually, the organotitanate is a tetraester of orthotitanic acid, the term "tetraester" being taken to include tetra-amides, tetra-anhydrides, and so on. The tetraesters of orthotitanic acid correspond to the Formula 2 except that $R_3$ is not hydrogen. Specific examples include tetraethyl titanate, tetrabutyl titanate, tetraisopropyl titanate, bis(acetylacetonyl)diisopropyl titanate, bis(acetylacetonyl) dimethyl titanate, bis(acetylacetonyl)-diethyl titanate, tetramethyl titanate, tetra(2-ethylhexyl) titanate, tetraacetylacetonyl titanate, tetraphenyl titanate, tetra(2-methoxyethoxy) titanate, diisopropyldiacetoxy titanate, tetraethylamido titanate, tetrapentylamido titanate, octylene glycol titanate, and mixtures thereof. Preferred organotitanates are tetrabutyl titanate and tetraacetylacetonyl titanate.

The esters of titanate acid hydrolyze quite readily in the presence of water, so that care should be exercised to maintain them in a relatively dry condition. The preparation of these titanates is known in the art and therefore is not described in detail. For example, tetraethyl titanate may be obtained through the reaction of sodium ethylate and titanium chloride; or through the reaction of the tetrachloride with anhydrous ethyl alcohol, using ammonia as a neutralizing agent. Other alkyl esters may also be made in this manner. Tetraphenyl titanate can be prepared from the reaction of phenol and titanium tetrachloride; or from the reaction of salicyclic acid and titanium tetrachloride. Octylene glycol titanate may be prepared as reacting octylene glycol with tetramethyl titanate in molar proportions of about 4 to 1.

In preparing a coating of the present invention, the liquid organopolysiloxane and the organotitanate are admixed under substantially anhydrous conditions to form a reaction mix. The organotitanate may be used in solvent solution in which the solvent may be any suitable non-reactive organic solvent. Lower alkyl alcohols are preferred such as isopropylalcohol. Fairly large loadings are possible, for example 75% organotitanate and 25% solvent by weight.

The reaction mix accordingly comprises very little solvent and practically all polysiloxane and titanate. This also tends to insure substantially anhydrous conditions. The present application of the reaction mix results in a relatively heavy coat in one step due to the virtually solventless nature of the application. As a result, little or no solvent is entrapped in the cured coating.

The reaction mix is applied to the fuel cell plates and reaction is then carried out. Thereafter, the fuel cell plate and the reactive coating precursor are heated relatively slowly at first to drive off any small amount of solvent and other volatiles that may be present and are then heated at higher temperatures for a time to complete the polymerization of the organopolysiloxane resin. Usually, the heat-cure may take place at about 120° C. to about 200° C. for about 5 minutes to about 1 hour. After application and polymerization of the organopolysiloxane to the solid state, the coating layer formed typically ranges in thickness from about 50μ to about 250μ.

It has been found that the presence of the organotitanate retards the polymerization rate of the polymerizable organopolysiloxane, which increases useful potlife. Even more significant, the organotitanate aids in adhering the organopolysiloxane to the plate, so that the resulting coating has improved resistance to debonding. It is believed that the organotitanate serves as a coupling agent.

The coating precursor may contain additives such as fillers, defoamers, flattening agents, wetting agents, slip aids, stabilizers, plasticizers, air-release agents, cure inhibitors, and the like. The additives can be reactive or non-reactive. Examples of useful air-release agents include polydimethyl siloxanes, such as various DC-series silicone oils commercially available from Dow Corning. An example of a useful cure inhibitor, which increases the pot life of the reactive coating precursor, is 3-methyl-1-pentyn-3-ol. In addition, a useful slip-aid is POLYFLO 523XF, which is a mixture of polyethylene and polytetrafluoroethylene powder and is commercially available from Micro Powders. Typically, such additives (including air-release agents, cure inhibitors, and slip aids) are used in amounts necessary to achieve the requisite coating characteristics, and each generally comprises up to about 5 wt. % of the total weight of the coating precursor.

The coating may also contain colorants (i.e., pigments and dyes). Examples of suitable colorants include $TiO_2$, phthalocyanine blue, phthalocyanine green, carbon black, basic carbonate white lead, zinc oxide, zinc sulfide, antimony oxide, zirconium oxide, lead sulfochromate, bismuth vanadate, bismuth molybdate, iron oxide magnetite, $Fe_3O_4$, and iron (III) oxide, $Fe_2O_3$, among others.

Epoxy Nitrile Resins

In addition to the disclosed acrylates and organopolysiloxanes, useful components of the coating precursor include an epoxy resin, an acrylonitrile butadience copolymer, an optional film-forming thermoplastic polymer, such as polyvinylchloride (PVC) resin, and a polyamine cross-linking agent. Based on total solids, the reactive coating precursor generally comprises from about 25 wt. % to about 50 wt. % epoxy resin, from about 35 wt. % to about 65 wt. % acrylonitrile butadiene copolymer, from about 0 wt. % to about 20 wt. % thermoplastic polymer, and from about 1 wt. % to about 5 wt. % polyamine cross-linking agent. The reactive coating precursor also contains one or more solvents for dispersing the solid components of the coating precursor prior to application on the fuel cell plates, and may also contain optional fillers, defoamers, flattening agents, wetting agents, slip aids, stabilizers, plasticizers, air-release agents, pigments, and the like. The coating precursor is typically cured by exposure to elevated temperature for a sufficient time to effect cross-linking of the reactive components and to volatilize the solvents.

The epoxy resin component of the coating precursor is included, in part, to impart chemical resistance and thermal stability, to build tensile strength and hardness, and to improve adhesion to the fuel cell plates. Epoxy resins are characterized by the presence of a three-member ring known as an epoxy, epoxide, oxirane, or ethyoxyline group. The disclosed coating precursor can employ any number of epoxy resins used in the manufacture of adhesives, composite materials and laminates. Examples of useful epoxy resins include diglycidyl ethers of bisphenol A, bisphenol F, aliphatic glycols, novolacs or other polyols; multi-functional cresol-novolac resins; epoxy phenol novolac resins; polynuclear phenol-glycidyl ether-derived resins; cycloaliphatic epoxy resins; and aromatic and heterocyclic glycidyl amine resins. The latter resins include tetraglycidylmethylenedianiline-derived resins, triglycidyl p-aminophenol-derived resins, and triazine-based resins such as triglycidyl isocyanurate. One or more of the epoxy resins can be brominated and/or phosphonated., Epoxy resins are commercially available from numerous suppliers including Shell Chemical Co. under the EPON, EPONOL, and EPIKOTE trade names; from Dow Chemical Co. under the DER, DEN, DEH, TACTIX, and QUATREX trade names; from Ciba-Geigy Corp. under the ARALDITE trade name; from Dainippon Ink and Chemicals under the EPOTUF and KELPOXY trade names; and from Union Carbide Co. under the UNOX trade name.

The acrylonitrile butadiene copolymer component of the coating precursor imparts elasticity, softness, and chemical resistance. The acrylonitrile butadiene rubber can be reactive or non-reactive. If reactive, it can contain amine groups that can react with the oxirane groups of the epoxy resin. Alternatively, the acrylonitrile butadiene copolymer can contain carboxyl groups, which provide curing sites for an amine cross-linking agent. Acrylonitrile butadiene copolymers containing carboxyl groups can be prepared by methods known in the art, for example, by copolymerizing butadiene, acrylic acid and acrylonitrile or by copolymerizing butadiene, methacrylic acid and acrylonitrile.

The reactive coating precursor also includes a polyamine curing agent and an optional catalyst to accelerate cross-linking. The curing agent ordinarily includes at least two primary or two secondary amine groups, which can react with carboxylic acid groups (if present) of the acrylonitrile butadiene copolymer and the oxirane groups of the epoxy resin. The carboxyl groups of the acrylonitrile butadiene copolymer, as well as residual hydroxyl groups of the epoxy resin (and phenolic hydroxyl groups of any novolac resin present in the blend), may react with one another forming a complex polymer network. Aliphatic, alicyclic, or aromatic polyamines can be used as curing agents. Useful aliphatic amines include polyalkylene polyamines such as diethylene triamine, triethylene tetramine, tetraethylene pentamine and pentaethylene hexamine. Other useful aliphatic amines include ethylene diamine, tetramethyl diamine, hexamethylene diamine and the like. Suitable aromatic polyamines include those having amine groups directly attached to the aromatic ring, and include alkylene dianilines such as methylene dianiline, and phenylene ether dianiline.

The coating precursor optionally may include an unreactive thermoplastic polymer, which acts as a film former. Examples of useful thermoplastic polymers include, but are not limited to polyethers, polyesters, polyamides, polystyrene, ethylene copolymers, and vinyl halide polymers, such as polyvinyl chloride (PVC). Other useful thermoplastic polymers include poly-α-olefins, ethylene-propylene-nonconjugated diene (EPDM) terpolymers grafted with a mixture of styrene and acrylonitrile (acrylonitrile EPDM styrene or AES), and styrene-acrylonitrile (SAN) copolymers. The SAN polymers include copolymers of acrylonitrile and methacrylate and terpolymers of acrylonitrile, styrene, and methyl methacrylate. Other SAN polymers include acrylonitrile copolymers of butyl acrylate, ethyl acrylate, 2-ethylhexyl acrylate, hydroxyethyl acrylate, methyl methacrylate, vinyl acetate, vinyl ethers, and vinylidene chloride. Other useful thermoplastic polymers include acrylonitrile buladiene styrene (ABS) polymers, which are composed of an elastomeric phase (typically a graft polymer of SAN and polybutadiene or a butadiene copolymer) dispersed in a thermoplastic matrix of styrene and acrylonitrile. SAN resins are commercially available from Dow Chemical Co. under the trade name TYRIL; ABS resins are commercially available from General Electric under the trade name CYOLAC; and AES resins are commercially available from Dow Chemical Co. under the trade name ROVEL.

As described above, the epoxy-nitrile coating precursor may contain various additives, including air release agents and slip aids. The additives can be reactive or non-reactive. Examples of useful air-release agents include polydimethyl siloxanes, such as various DC-series silicone oils commercially available from Dow Coming, and SAG 47, which is commercially available from OSI Specialties. A useful slip-aid is POLYFLO 523XF, which is a mixture of polyethylene and polytetrafluoroethylene powder and is commercially available from Micro Powders. Typically, such additives (including air-release agents and slip aids) are used in amounts necessary to achieve the requisite coating characteristics, and each generally comprises up to about 5 wt. % of the total weight of the coating precursor.

In addition, the coating precursor may also contain one or more compatible solvents to help disperse the precursor components. Useful solvents include alcohols, ethers, ketones, tetrahydrofuran, xylene, and the like. Particularly useful solvents include 2(2-butoxyethoxy) ethanol and diethylene glycol n-butyl ether, which is available from Dow Chemical Co. under the trade name BUTYL CARBITOL. The coating may also contain colorants (i.e., pigments and dyes). Examples of suitable colorants include $TiO_2$, phthalocyanine blue, phthalocyanine green, carbon black, basic carbonate white lead, zinc oxide, zinc sulfide, antimony oxide, zirconium oxide, lead sulfochromate, bismuth vanadate, bismuth molybdate, iron oxide magnetite, $Fe_3O_4$, and iron (III) oxide, $Fe_2O_3$, among others.

Application of Coating Precursors

Each of the disclosed reactive coating precursors can be applied using coating techniques that will be apparent to persons of ordinary skill in the art upon reading the disclosure, including roller coating, dipping, brushing, spraying, stenciling, screen printing, and the like. However, of these coating techniques, screen printing is preferred because of its low cost, speed, and accuracy. The coating precursors may be applied to one or both sides of the fuel cell plate and as a cover-all coating or in selected continuous or discontinuous patterns depending on the insulating and sealing requirements of the fuel cell assembly. As noted above, the coating thickness for fuel cell plates is typically from about 50μ to about 250μ.

EXAMPLES

The following examples are intended as illustrative and non-limiting, and represent specific embodiments of the present invention.

Examples A–P

Acrylate Resin Coatings

Table 1 lists coating precursor compositions (formulations A–P) for insulating and sealing fuel cell plates. Each of the compositions includes an acrylated aliphatic or aromatic urethane oligomer, an isobomyl acrylate mono-functional monomer, a pair of photoinitiators (1-phenyl-2-hydroxy-2-methyl-1-propanone and benzophenone), and a polydimethylsiloxane air-release agent. In addition, all of the formulations include a multi-functional monomer—either propoxylated glycerol triacrylate (formulations A–I, K–O) or trimethylolpropane ethoxy triacrylate monomer (formulations J, P). Some of the formulations also include an acrylated olefinic oligomer (formulations B–E, G, I, L–O), an acrylated epoxy oligomer (formulations B, C, E, F, H–O), an acrylated epoxy monomer (formulation O), a methacrylated polyol adhesion promoter (formulations A–D, F–H, J–O), or an octyidecyl mono-functional monomer (formulation O).

The formulations listed in Table 1 were prepared by introducing the urethane oligomers and the polydimethylsiloxane air-release agent in a vessel. The mixture was stirred with heating to lower the viscosity of the mixture. The methacrylated polyol adhesion promoter (if present) was then added to the mixture. Once the adhesion promoter was fully dispersed, the non-urethane oligomers, and the mono-functional monomers (isobomyl acrylate and octydecyl acrylate monomer) were added (in order). In a separate vessel, benzophenone was dissolved in 1-phenyl-2-hydroxy-2-methyl-1-propanone and in the multi-functional monomers with heating. The resulting blend of photoinitiators and multi-functional monomers were then admixed with the other coating precursor components.

Test samples were prepared on various substrates by screen printing (110 mesh polyester screen, nominal 0.001-inch and 0.005 inch pad heights) or by casting (fixed clearance draw down knife). Depending on the test, the nominal coating thickness was 0.001 inches (adhesion, mandrel flex, coolant blisters) or 0.005–0.006 inches (tensile strength, elongation, Shore A hardness). However, the coating thickness of adhesion test samples of formulations H and P was 0.005–006 inches. Each of the example formulations was cured by successive exposure to 375 watts/inch UV lamps having Fusion type D bulbs (375 nm) and type H$^+$ bulbs (220 nm), respectively, at line speeds of 15–25 feet per minute. The test samples were used to measure various properties, including tensile strength, elongation, Shore A hardness, adhesion (scratch, blistering), and temperature resistance (mandrel flex).

Table 1 lists scratch adhesion results for test samples immersed in fuel cell coolant (formulations H, P), automotive coolant (A–P), or automotive oil (formulations J, K). Test samples of formulation H were immersed in three different heat transfer fluids at ambient temperature for 70 hours. The heat transfer fluids used were an isoparaffinic fluid commercially available from Solutia Inc. under the trade name THERMINOL D12, a proprietary fluid commercially available from Dynalene Heat Transfer Fluids under the trade name DYNALENE FC-1, and a fluorinated hydrocarbon fluid commercially available from 3M under the trade name PF-5080. Test samples of formulations A–P were immersed in a 50:50 v/v mixture of GM LONG LIFE COOLANT and water for 72 hours at 100° C.; test samples J and K were immersed in ASTM IRM 903 oil for 72 hours at 150° C. Following immersion, adhesion was measured using a RPM 516 scratch test method. In accordance with the test method, a coated substrate was secured on a translatable stage and a "needle" was lowered onto the surface of the coated substrate. During the test, a 500-gram dead weight load was applied to one end of the needle so that the other end of the needle penetrated the coating. The needle executed a circular motion while the specimen was translated at a rate of about 2.5 mm/cycle, producing a series of 10-mm diameter, overlapping circular scratch marks in the coating. The appearance of the coating was ranked on a scale of 1 (poor adhesion) to 10 (best adhesion). Each of the entries in Table 1 represents the average of three test samples per fluid; the designation "dry" refers to test samples that were not immersed in coolant or oil prior to the scratch test.

Table 1 also lists tensile strength, elongation, and Shore A hardness for each of the coating formulations. To measure tensile strength and elongation, 1 inch by 4 inch specimens were die-cut from samples that were cast on polyester film using a fixed clearance draw down knife. The sample thickness was measured at multiple points on the film (minimum of six places near the center of the specimen), and the samples were pulled at ambient temperature on an Instron tester at a crosshead speed of 0.2 inches per minute. For each formulation, Table 1 reports average tensile strength and elongation at break based on five samples. To measure Shore A hardness, 0.5 inch by 1.5 inch specimens were cut from samples cast on polyester film. Specimens from a single formulation were stacked to obtain an overall sample thickness of 0.125 inches. The hardness of the "stacked" test sample was measured using a table mounted Shore A hardness tester. Five hardness measurements were obtained for each formulation.

Table 1 also lists temperature resistance data (denoted "temperature mandrel") and viscosity data. Temperature resistance was measured using a modified version of ASTM D573. Each test specimen (screen-printed coating on a 0.008 inch thick stainless steel coupon) was heat aged for 22 hours at 185° C., bent around a 6-inch diameter mandrel, and then visually inspected for cracks in the coating or for loss of bond between the coupon and the coating. The appearance of the coating was ranked on a scale of 1 (many cracks, loss of bond) to 10 (few or no cracks, little or no loss of bond); data in Table 1 represent the average of three test specimens. The viscosity entries are based on a subjective assessment of the flow characteristics of the coating precursor. A ranking of 1 indicates the coating precursor would be difficult to screen print, and a ranking of 10 indicates that the coating precursor would be easy to screen print.

Example Q

Organopolysiloxane Coating

Table 2 lists an organopolysiloxane coating precursor composition for insulating and sealing fuel cell plates. The formulation includes an organopolysiloxane base polymer and a silicone hydride curing agent that are commercially available from Dow Coming under the trade name 96-083. The organopolysiloxane resin is a long chain dimethylpolysiloxane having a weight average molecular weight of about 15,900, and contains a vinyl end-block, which comprises less than 2 wt. % of the base polymer. The formulation also includes a platinum catalyst for accelerating the cure, and a cure inhibitor (3-methyl-1-pentyn-3-ol) to extend shelf life. The platinum catalyst is commercially available from Dow Corning under the trade name Sly-Off 4000, and the cure inhibitor is available from Air Products and Chemicals, Inc. under the trade name SURFYNOL® 61. The formulation contains green pigment that is commercially available from Harwick Chemical Corp. under the trade name Stan-Tone D5004, and also contains white pigment (TiO$_2$) that is commercially available from DuPont under the trade name R960.

Table 2 lists average tensile strength, elongation at break, and Shore A hardness for the disclosed organopolysiloxane. Test specimens with a nominal thickness of 0.005–0.006 inches were prepared by mixing the components of Table 2 in a standard laboratory mixer at room temperature, and casting the coating precursor on substrates using a fixed clearance draw down knife. The coating precursor was cured in an oven for about five minutes at about 200° C., and was tested in accordance with the method described in the acrylate resin examples.

Example R
Epoxy Nitrile Coating

Table 3 lists an epoxy nitrile coating precursor composition for insulating and sealing fuel cell plates. The formulation includes a two-part resin system that includes an epoxy resin, a PVC resin, acrylonitrile butadiene copolymer, and polyamine cross-linking agent dispersed in a solvent. The epoxy and PVC resin, and the acrylonitrile butadiene copolymer and polyamine cross-linking agent, are commercially available from Dennis Chemical Co. under the trade names Denflex FX 3551A and Denflex FX 3551B, respectively. The formulation includes a pair of polydimethylsiloxane air-release agents, DC 200 and SAG 47, and a slip aid, POLYFLO 523XF, which is a blend of polyethylene and polytetrafluoroethylene powder. DC 200, SAG 47, and POLYFLO 523XF are commercially available from Dow Corning, OSI Specialties, and Micro Powders, respectively. To help disperse coating precursor components, the formulation includes an additional solvent, diethylene glycol n-butyl ether, which is commercially available from Dow Chemical Co. under the trade name BUTYL CARBITOL.

Table 3 lists average tensile strength, elongation at break, Shore A hardness, and adhesion for the disclosed epoxy nitrile resin. Test specimens were prepared by mixing the components of Table 3 in a standard laboratory mixer at room temperature and screen printing the precursor on steel plates (for tensile strength, elongation and Shore A hardness determinations) or graphite composite fuel cell plates (for adhesion tests). The samples applied on steel plates were cured in a forced air (convection) oven for about 10 minutes at about 180° C.; the samples applied on graphite composite fuel cell plates were also cured in a forced air oven, but were cured at about 140° C. for at least 30 minutes. All of the test samples were tested in accordance with the methods described in Examples A–P.

TABLE 1

| Acrylate Resin Coating Precursors (wt. %) | | | | | | |
|---|---|---|---|---|---|---|
| | A | B | C | D | E | F |
| Acrylated Aliphatic Urethane Oligomer | | | | | | |
| RXO 1336 | 37.2 | 25.7 | 19.7 | 36.7 | 32.0 | 34.2 |
| Acrylated Aromatic Urethane Oligomer | | | | | | |
| RSX 89359 | — | — | — | — | — | — |
| EBECRYL 4827 | — | — | — | — | — | — |
| Acrylated Olefinic Oligomer | | | | | | |
| CN302 | — | 12.9 | 19.7 | 12.2 | 21.3 | — |
| FX 9005 | — | — | — | — | — | — |
| Acrylated Acrylic Oligomer | | | | | | |
| NTX 4887 (fluoro-modified) | — | — | — | — | — | — |
| Acrylated Epoxy Oligomer | | | | | | |
| EBECRYL 3708 | — | 12.9 | 19.7 | — | 10.7 | 22.8 |
| Acrylated Epoxy Monomer + Oligomer | | | | | | |
| RXO 2034 | — | — | — | — | — | — |
| Methacrylated Polyol | | | | | | |
| EBECRYL 168 | — | 5.1 | 7.9 | 9.8 | — | 4.6 |
| Isobornyl Acrylate Monomer | | | | | | |
| IBOA | 49.6 | 34.3 | 26.2 | 32.6 | 28.4 | 30.4 |
| Trimethylolpropane Ethoxy Triacrylate Monomer | | | | | | |
| TMPEOTA | — | — | — | — | — | — |
| OctylDecyl Acrylate Monomer | | | | | | |
| ODA | — | — | — | — | — | — |
| Propoxylated Glycerol Triacrylate | | | | | | |
| OTA 480 | 5.0 | 3.4 | 2.6 | 3.3 | 2.8 | 3.0 |
| 1-phenyl-2-hydroxy-2-methyl-1-propanone | | | | | | |
| DUROCUR 1173 | 4.7 | 3.3 | 2.5 | 3.1 | 2.7 | 2.9 |
| Benzophenone | 2.4 | 1.6 | 1.3 | 1.5 | 1.4 | 1.4 |
| Polydimethylsiloxane | | | | | | |
| SAG 47 | 1.2 | 0.9 | 0.7 | 0.8 | 0.7 | 0.8 |
| Tensile (PSI) | 1050 | 1100 | 1100 | 1030 | 750 | 1070 |
| Elongation (%) | 169 | 102 | 106 | 148 | 129 | 157 |
| Shore A Hardness | 85 | 84 | 83 | 78 | 75 | 81 |
| Adhesion Scratch Dry | 5 | 7 | 10 | 8.3 | 2.3 | 9.0 |

TABLE 1-continued

| Acrylate Resin Coating Precursors (wt. %) | | | | | | |
|---|---|---|---|---|---|---|
| Adhesion Scratch Coolant | 1 | 2 | 2 | 1 | 4 | 3 |
| Adhesion Scratch Oil | — | — | — | — | — | — |
| Coolant Blisters | 1 | 5 | 5 | 3 | 8.5 | 4.0 |
| Temperature Mandrel | 10 | 6 | 4.3 | 10 | 10 | 10 |
| Viscosity | 10 | 5 | 1 | 6 | 4 | 6 |

| | G | H[1] | I | J | K | L |
|---|---|---|---|---|---|---|
| Acrylated Aliphatic Urethane Oligomer | | | | | | |
| RXO 1336 | 40.9 | 43.6 | 38.5 | 28.5 | 38.0 | 34.4 |
| Acrylated Aromatic Urethane Oligomer | | | | | | |
| RSX 89359 | — | — | — | 14.3 | — | — |
| EBECRYL 4827 | — | — | — | 4.8 | 4.2 | — |
| Acrylated Olefinic Oligomer | | | | | | |
| CN 302 | 20.5 | — | 9.6 | — | — | — |
| FX 9005 | — | — | — | — | — | 17.2 |
| Acrylated Acrylic Oligomer | | | | | | |
| NTX 4887 (fluoro-modified) | — | — | — | — | — | — |
| Acrylated Epoxy Oligomer | | | | | | |
| EBECRYL 3708 | — | 10.9 | 19.3 | 9.5 | 8.4 | 8.6 |
| Acrylated Epoxy Monomer + Oligomer | | | | | | |
| RXO 2034 | — | — | — | — | — | — |
| Methacrylated Polyol | | | | | | |
| EBECRYL 168 | 4.1 | 8.7 | — | 5.0 | 4.5 | 3.5 |
| Isobornyl Acrylate Monomer | | | | | | |
| IBOA | 27.3 | 29.1 | 25.7 | 26.6 | 35.5 | 30.1 |
| Trimethylolpropane Ethoxy Triacrylate Monomer | | | | | | |
| TMPEOTA | — | — | — | 4.75 | — | — |
| OctylDecyl Acrylate Monomer | | | | | | |
| ODA | — | — | — | — | — | — |
| Propoxylated Glycerol Triacrylate | | | | | | |
| OTA 480 | 2.7 | 2.91 | 2.6 | — | 3.55 | 2.30 |
| 1-phenyl-2-hydroxy-2-methyl-1-propanone | | | | | | |
| DUROCUR 1173 | 2.6 | 2.76 | 2.4 | 3.8 | 3.40 | 2.18 |
| Benzophenone | 1.3 | 1.38 | 1.2 | 1.90 | 1.70 | 1.09 |
| Polydimethylsiloxane | | | | | | |
| SAG 47 | 0.7 | 0.73 | 0.6 | 0.95 | 0.84 | 0.58 |
| Tensile (PSI) | 510 | 1030 | 895 | 1150 | 670 | 1365 |
| Elongation (%) | 145 | 170 | 143 | 85 | 135 | 74.8 |
| Shore A Hardness | 72 | 75 | 73 | 84 | | 87 |
| Adhesion Scratch Dry | 7.3 | 8.0 | 1.0 | 9 | 7.5 | 7.5 |
| Adhesion Scratch Coolant | 2 | 3,1,3 | 3 | 1 | 1 | 5.5 |
| Adhesion Scratch Oil | — | — | — | 8 | 6 | — |
| Temperature Mandrel | 10 | 10 | 10 | — | — | — |
| Coolant Blisters | 6.5 | 4.0 | 5 | — | — | — |
| Viscosity | 7 | 8 | 2 | 1 | 5 | — |

| | M | N | O | P[2] |
|---|---|---|---|---|
| Acrylated Aliphatic Urethane Oligomer | | | | |
| RXO 1336 | 29.0 | 29.5 | 30.8 | — |
| Acrylated Aromatic Urethane Oligomer | | | | |
| RSX 89359 | — | — | — | 61.5 |
| EBECRYL 4827 | — | — | — | — |
| Acrylated Olefinic Oligomer | | | | |
| CN 302 | 16.1 | — | 17.1 | — |
| FX 9005 | — | 7.1 | — | — |
| Acrylated Acrylic Oligomer | | | | |
| NTX 4887 (fluoro-modified) | — | 21.9 | — | — |

TABLE 1-continued

| Acrylate Resin Coating Precursors (wt. %) | | | | |
|---|---|---|---|---|
| Acrylated Epoxy Oligomer | | | | |
| EBECRYL 3708 | 8.1 | 7.4 | 8.6 | — |
| Acrylated Epoxy Monomer + Oligomer | | | | |
| RXO 2034 | — | — | 4.2 | — |
| Methacrylated Polyol | | | | |
| EBECRYL 168 | 3.3 | 3.0 | 3.4 | — |
| Isobornyl Acrylate Monomer | | | | |
| IBOA | 28.2 | 25.8 | 27.0 | 29.3 |
| Trimethylolpropane Ethoxy Triacrylate Monomer | | | | |
| TMPEOTA | — | — | — | 1.91 |
| OctylDecyl Acrylate Monomer | | | | |
| ODA | — | — | 3.00 | — |
| Propoxylated Glycerol Triacrylate | | | | |
| OTA 480 | 2.15 | 2.30 | 2.28 | — |
| 1-phenyl-2-hydroxy-2-methyl-1-propanone | | | | |
| DUROCUR 1173 | 2.04 | 1.87 | 2.17 | 4.56 |
| Benzophenone | 1.02 | 0.94 | 1.08 | 1.14 |
| Polydimethylsiloxane | | | | |
| SAG 47 | 0.54 | 0.50 | 0.57 | 1.23 |
| Tensile (PSI) | 1112 | 1028 | 640 | 2100 |
| Elongation (%) | 122 | 80.0 | 125 | 105 |
| Shore A Hardness | 84 | 85 | 75 | 84 |
| Adhesion Scratch Dry | 7.5 | 7.5 | 8.0 | 1 |
| Adhesion Scratch Coolant | 3.0 | 2.0 | 2.0 | 1 |
| Adhesion Scratch Oil | — | — | — | 6 |
| Temperature Mandrel | — | — | — | 8 |
| Coolant Blisters | — | — | — | 2 |
| Viscosity | — | — | — | 10 |

[1]Coolants tested: THERMINOL D12, DYNALENE FC-1; PF-5080 (in order shown); all other formulations tested with a 50:50 v/v mixture of GM LONG LIFE COOLANT.
[2]Contains 0.03 wt. % $Fe_3O_4$ and 0.32 wt. % $Fe_2O_3$.

TABLE 2

| Organopolysiloxane Resin (wt. %) | |
|---|---|
| | Q |
| Polydimethylsiloxane | 86.9 |
| DC 96-083 Resin | |
| Green Pigment | 2.26 |
| STAN-TONE D5004 | |
| Titanium Dioxide | 0.48 |
| R960 | |
| 3-methyl-1-pentyn-3-ol | 0.01 |
| Platinum Catalyst | 0.01 |
| SLY-OFF 4000 | |
| Polyethylene-PTFE | 1.49 |
| POLYFLO 523XF | |
| Silicone Hydride | 8.68 |
| DC 96-083 Cure Agent | |
| Tensile (PSI) | 535 |
| Elongation (%) | 170 |
| Share A Hardness | 59 |

TABLE 3

| Epoxy Nitrile Resin (wt. %) | |
|---|---|
| | R |
| Polyethylene-PTFE | 2.0 |
| POLYFLO 523XF | |
| DENFLEX FX3551A | 40.7 |
| Epoxy Resin[1] | |
| Polyvinyl Chloride Resin[1] | |
| DENFLEX FX3551B | 51.5 |
| Acrylonitrile Butadiene Copolymer[1] | |
| Poly Amine Hardener[1] | |
| Polydimethylsiloxane | |
| DC 200 | 1.9 |
| SAG 47 | 0.5 |
| Diethylene Glycol n-Butyl Ether | 3.4 |
| BUTYL CARBITOL | |
| Tensile (PSI) | 1200 |
| Elongation (%) | 80 |
| Shore A Hardness | 80 |
| Adhesion Scratch Dry | 7 |
| Adhesion Scratch Coolant[2] | 5, 5, 4 |

[1]Dispersed in a solvent.
[2]Coolants tested: THERMINOL D12, DYNALENE FC1, PF-5080 (in order shown).

It is to be understood that the above description is intended to be illustrative and not limiting. Many embodiments will be apparent to those of skill in the art upon reading the above description. Therefore, the scope of the invention should be determined, not with reference to the above description, but instead with reference to the appended claims, along with the full scope of equivalents to which such claims are entitled. The disclosures of all articles and references, including patent applications and publications are incorporated herein by reference for all purposes.

What is claimed is:

1. A process for sealing and insulating a fuel cell plate, the process comprising:

provided a gas impermeable fuel cell plate having first and second surfaces;

applying a coating precursor on at least the first surface of the fuel cell plate, the coating precursor adapted to polymerize or to cross-link in response to infrared radiation; and exposing the coating precursor on the fuel cell plate to infrared radiation or to heat to initiate polymerization or cross-linking, wherein the coating precursor includes an epoxy resin, a thermoplastic and an acrylonitrile butadiene copolymer.

2. The process of claim 1, wherein the coating precursor includes a cross-linking agent.

3. The process of claim 2, wherein the cross-linking agent is a polyamine.

4. The process of claim 1, wherein the thermoplastic is polyvinylchloride resin.

5. The process of claim 1, wherein the coating precursor includes a solvent.

6. The process of claim 1, wherein the coating precursor includes a colorant.

7. The process of claim 1, wherein the coating precursor includes an air-release agent.

8. The process of claim 1, wherein the coating precursor includes slip agent.

9. An insulated fuel cell plate comprising:

a plate having first and second surfaces; and a coating precursor applied on at least one of the first and second surfaces of the plate, the coating precursor comprising:
an epoxy resin;
an acrylonitrile butadiene copolymer;
a thermoplastic film-former;
a polyamine cross-linking agent; and
a solvent.

10. The insulated fuel cell plate of claim 9, wherein the thermoplastic film-former is a polyvinylchloride resin.

11. The insulated fuel cell plate of claim 9, wherein the coating precursor includes a colorant.

12. The insulated fuel cell plate of claim 9, wherein the coating precursor includes an air-release agent.

13. The insulated fuel cell plate of claim 12, wherein the air-release agent is a polydimethylsiloxane.

14. The insulated fuel cell plate of claim 9, wherein the coating precursor includes a slip-aid.

15. The insulated fuel cell plate of claim 14, wherein the slip-aid is a polytetrafluoroethylene powder.

* * * * *

UNITED STATES PATENT AND TRADEMARK OFFICE
CERTIFICATE OF CORRECTION

PATENT NO.     : 6,730,363 B1                                             Page 1 of 1
DATED          : May 4, 2004
INVENTOR(S)    : Kanu G. Shah et al.

It is certified that error appears in the above-identified patent and that said Letters Patent is hereby corrected as shown below:

Title page,
Item [73], Assignee, "Ottawa Lake, MI" should read -- Toledo, OH --

Signed and Sealed this

Ninth Day of November, 2004

JON W. DUDAS
*Director of the United States Patent and Trademark Office*

UNITED STATES PATENT AND TRADEMARK OFFICE
CERTIFICATE OF CORRECTION

PATENT NO. : 6,730,363 B1
DATED : May 4, 2004
INVENTOR(S) : Kanu G. Shah et al.

It is certified that error appears in the above-identified patent and that said Letters Patent is hereby corrected as shown below:

<u>Title page,</u>
Item [73], Assignee, "Ottawa Lake, MI" should read -- Toledo, OH --
Item [*] Notice, replace "U.S.C. 154(b) bydays.days." with -- U.S.C. 154(b) by 117 days. --

Signed and Sealed this

Fourth Day of January, 2005

JON W. DUDAS
*Director of the United States Patent and Trademark Office*